US007597364B2

United States Patent
Muneta

(10) Patent No.: US 7,597,364 B2
(45) Date of Patent: Oct. 6, 2009

(54) DOOR HANDLE DEVICE FOR VEHICLE

(75) Inventor: Tsuyoshi Muneta, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 13 days.

(21) Appl. No.: 11/512,317

(22) Filed: Aug. 30, 2006

(65) Prior Publication Data

US 2007/0046080 A1    Mar. 1, 2007

(30) Foreign Application Priority Data

Aug. 31, 2005    (JP) .............................. 2005-250496

(51) Int. Cl.
*E05C 19/06*    (2006.01)
(52) U.S. Cl. .................... 292/80; 292/336.3
(58) Field of Classification Search .................. 292/80, 292/201, 216, 347, 348, 336, 300; 340/426.28, 340/5.62, 547
See application file for complete search history.

(56) References Cited

U.S. PATENT DOCUMENTS 6,459,373 B1 * 10/2002 Edwards ..................... 340/547
6,740,834 B2 * 5/2004 Sueyoshi et al. ............ 200/600
7,029,054 B2 * 4/2006 Kobayashi et al. ........ 296/146.1
7,132,768 B2 * 11/2006 Ieda et al. ................... 307/652
7,192,285 B2 * 3/2007 Makino et al. ................ 439/34
7,199,317 B2 * 4/2007 Ieda et al. ................. 200/61.62

FOREIGN PATENT DOCUMENTS

JP    2002-30844    1/2002
JP    2004-316164   11/2004

* cited by examiner

*Primary Examiner*—Peter M. Cuomo
*Assistant Examiner*—Mark Williams
(74) *Attorney, Agent, or Firm*—Kratz, Quintos & Hanson, LLP

(57) ABSTRACT

The invention provides a vehicle door handle device, which can fix a harness of an electric component to an arm of a grip without enlarging the arm. The invention also has a configuration in which an arm insertion hole which allows the arm of the grip to be inserted therethrough is formed in a base plate of a handle seat to be disposed between the grip and a door panel, a pair of frame plate parts are provided so as to protrude parallel to each other from an edge of the arm insertion hole, and the pair of frame plate parts are integrally provided with a holding part having formed therein a harness fastening hole which allows the harness of the electric component to be inserted therethrough.

6 Claims, 9 Drawing Sheets

DOOR HANDLE DEVICE FOR VEHICLE

BACKGROUND OF THE INVENTION

The present invention relates to a vehicle door handle device, having an electric component such as a transmission antenna provided therein.

BACKGROUND ART

In recent years, a so-called smart entry system has been developed that performs locking or unlocking of a door lock of a vehicle only by an operator approaching or receding from the vehicle while he/she carries a radio device. In the smart entry system, a transmission antenna is attached to a grip of a door handle which protrudes outwardly of the door panel and attached thereto. The transmission antenna transmits a transmission request radio wave (seizing signal) to the radio device carried by the operator outside the vehicle.

As a vehicle door handle device for such a smart entry system, a grip which is grasped by an operator to open and close a door is provided so as to protrude to the door panel, as disclosed in Japanese Patent Application Laid-Open (JP-A) No. 2002-30844.

The grip includes a base and a cover which is attached to the base.

The base is provided with an arm. The arm is engaged with a member fixed to the door panel so as to be used as a fulcrum when the grip rotates.

Also, an electric component, such as a transmission antenna, is disposed between the base and cover of the grip. Harness to be connected to the electric component passes through a hole formed in the arm, is pulled out into the door panel, and is connected to an onboard control device.

Further, in a vehicle door handle device of JP-A No. 2004-316164 which is configured substantially similarly to that of the above JP-A No. 2002-30844, a hole, which allows a connector having harness mounted thereto to be inserted therethrough, is formed in a base which constitutes a grip.

A groove which can accommodate the harness is formed in an arm provided in the base such that the groove communicates with the hole formed in the base.

Also, the harness to be connected to the electric component disposed in the grip is allowed to pass through the hole formed in the base, and is pulled out into the door panel.

In addition, the harness is held by the arm by attaching a guide which covers the groove to the arm after a portion of the harnesses led into the groove formed in the arm is accommodated into the groove of the arm.

In the configuration disclosed in the above JP-A No. 2002-30844, the size of a hole through which a harness is allowed to pass is determined depending on the size of the arm of the grip. For this reason, if the arm is not enlarged in a case where a plurality of harnesses are connected to an electric component, or in a case where a connector is connected to a tip of a harness, it is difficult to insert the harness through the hole.

Therefore, although it is conceivable to form the arm largely and thereby enlarge a hole through which a harness passes, this increases the size of a vehicle door handle device, which is not preferable.

Further, even in the configuration of the vehicle handle device disclosed in the above JP-A No. 2004-316164, a groove should be formed largely in order to accommodate a plurality of harnesses.

Furthermore, since a guide for holding a harness should be provided in the groove formed in the arm, there is a problem in that the number of components increases and the cost rises as compared with the technique of JP-A No. 2002-30844.

Moreover, in the configuration of the above-mentioned prior art, a position where a harness is to be fixed is located nearer to the door panel side (vehicle outside) than the tip of the arm provided in the grip.

Consequently, a distance between the position where a harness is to be fixed and a connector to be connected to an onboard control device becomes long. As a result, there has been a possibility that an abnormal noise occurs by the fact that a portion of the harness oscillates and contacts the inside of the door panel, etc. due to vibration during traveling of a vehicle, vibration of an engine, etc.

Accordingly, a technical object of the invention is to realize a configuration capable of fixing a harness of an electric component to an arm of a grip without enlarging the arm, and shortening a distance between a position where a harness is to be fixed and a connector to thereby suppress oscillation of the harness and prevent occurrence of an abnormal noise.

SUMMARY OF THE INVENTION

In order to solve the above technical object, according to an aspect of the invention, there is provided a vehicle door handle device having a door handle. The door handle is composed of a handle base fixed inside a door panel, a grip at one end of which an arm having a shaft hole which is pivotably engaged with the handle base is provided, and in which a recessed part accommodating an electric component is formed, and a cover which covers the recessed part of the grip. The door handle device includes a seat mounting hole which is opened so that a harness connected to the electric component can be drawn out to the outside and which is formed in the grip, and a handle seat having a base plate which is fixed to the grip, the base plate being disposed between the grip and the door panel. The handle seat is provided with an arm insertion hole which is formed in the base plate to allow the arm of the grip to be inserted therethrough, a pair of frame plate parts protruding parallel to each other from an edge of the arm insertion hole, and a holding part having a harness fastening hole which is provided integrally in the frame plate parts to allow the harness to be inserted therethrough.

This configuration makes it possible to wire the harness connected to the electric component accommodated within the grip along the arm from the inside of the grip, without enlarging the arm.

Further, since the holding part which allows a harness to be inserted therethrough is provided in the handle seat provided as a cushioning member between the grip and the door panel, the harness of the electric component can be held by the arm of the grip without increasing the number of components.

Further, in the door handle device for a vehicle according to the invention, preferably, the base plate of the handle seat is provided with a fixed part which covers a portion of the seat mounting hole of the grip, and the arm insertion hole of the handle seat is formed so as to communicate with the portion of the seat mounting hole with the handle seat being fixed to the handle base, so that the harness is led to the harness fastening hole from the arm insertion hole.

This configuration makes it possible to cover the seat mounting hole with the handle seat even in a case where the seat mounting hole is opened largely such that a connector can be inserted therethrough.

Further, since the arm formed in the base is located in the arm insertion hole, the substantial opening range of the arm insertion hole can be narrowed. Consequently, a harness can be inserted into the holding part even in a state where a connector is connected to the harness.

Moreover, in the door handle device for a vehicle according to the invention, preferably, a side face of the holding part provided in the handle seat is provided with cutouts which can introduce the harness into the harness fastening hole.

Since this configuration only needs to size the harness fastening hole to such a degree that a harness connected to an electric component can be inserted through the harness fastening hole regardless of the size of a connector, it is possible to surely prevent a harness from oscillating within the holding part.

Further, in the door handle device for a vehicle according to the invention, preferably, the holding part provided in the handle seat is provided at tips of the frame plate parts such that it is located nearer to the inner side of the door panel than a tip of the arm of the grip.

This configuration makes it possible to shorten a distance between the connector connected at the tip of the harness and the holding part.

Accordingly, since a portion of the harness which is not fixed, oscillation of the harness caused by vibration during traveling of a vehicle, vibration of an engine, etc., can be suppressed, and it is possible to prevent occurrence of an abnormal noise caused by contact of the harness with the door panel, etc.

As described above, in the door handle device for a vehicle according to the invention, the harness connected to the electric component accommodated within the grip is held by the holding part provided as a cushioning member between the grip and the door panel. This makes it possible to wire the harness along the arm without increasing the number of components.

DESCRIPTION OF THE PREFERRED EMBODIMENT

Next, embodiments of the present invention will be described with reference to the accompanying drawings.

Figure 1:
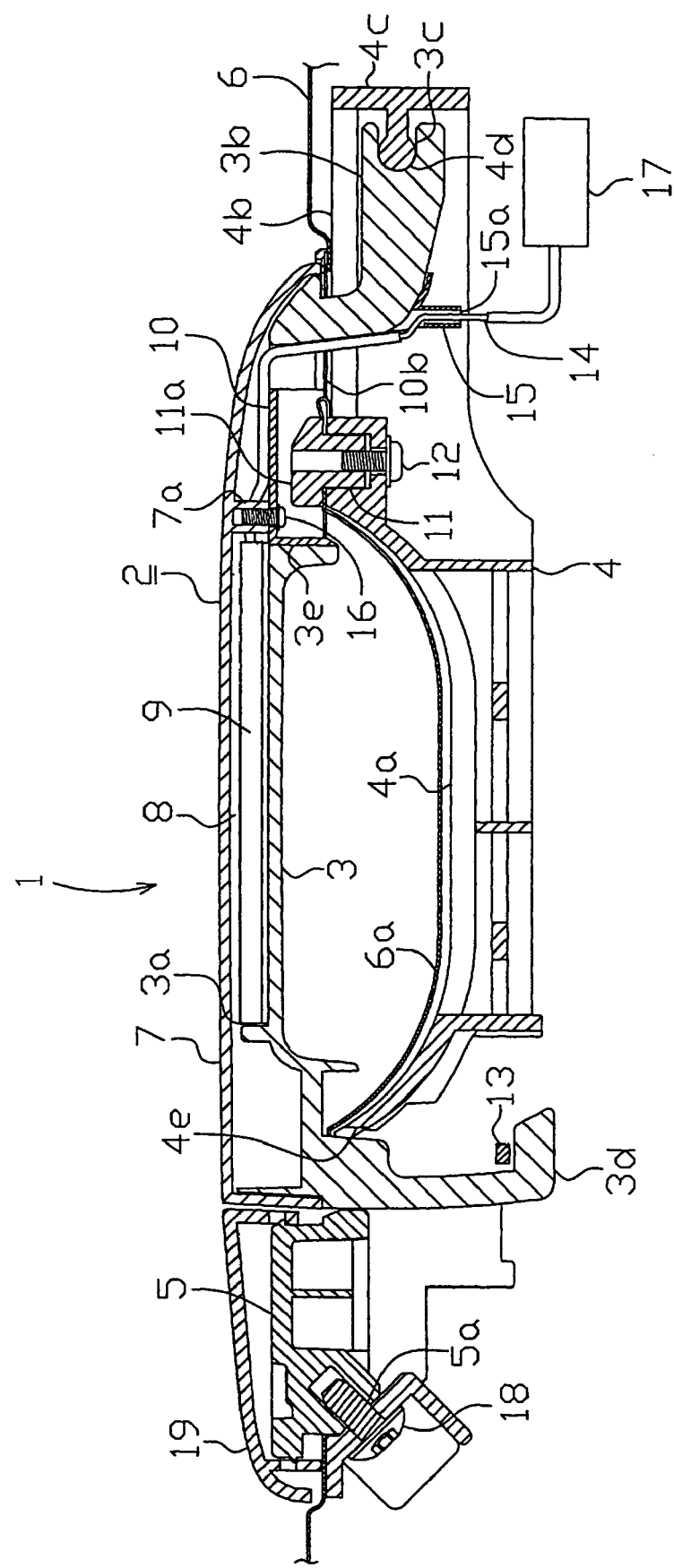
FIG. 1 is a longitudinal sectional view of a vehicle door handle device according the invention.

FIG. 1 is a longitudinal sectional view showing a door handle device 1 for a vehicle that is an embodiment of the invention.

A door handle 2 provided in the door handle device 1 is composed of a grip 3 which is elongated in the front and rear directions (right and left directions in FIG. 1) of a vehicle, a handle base 4 for fixing the grip 3 to a door panel 6 of the vehicle, and an external attaching member 5 to which a cylinder lock (not shown) is to be fixed.

The external attaching member 5 is designed to be attached to a predetermined position from a vehicle outside of the door panel 6. A screw stopper 5a into which a screw 18 is screwed is formed in the external attaching member 5.

Further, an external cover 19 which covers the external attaching member 5 is attached to a vehicle outside of the external attaching member 5.

The door handle 2 is composed of the grip 3 and a cover 7 which are made of resin and are integrally fixed with screws (not shown).

Further, the door handle is configured such that a recessed part 3a is formed substantially in a central part of the grip 3, and an electric component 9 to be described later is accommodated within a hollow portion 8 which is defined by the recessed part 3a and the cover 7.

In addition, a substantially L-shaped arm 3b which is bent toward the front side (right side in FIG. 1) of the vehicle from a surface of the grip opposite to the surface thereof having the recessed part 3a formed therein is provided so as to protrude from one end of the grip 3.

A shaft hole 3c is formed in a protruding end of the arm. Further, a substantially U-shaped protruding portion 3d is provided so as to protrude from a portion of the grip 3 opposite to the arm 3b.

Moreover, a seat mounting hole 3e (FIG. 4) opened to a vehicle inside (bottom side in FIG. 1) of the door panel 6 is formed in a position (left side in FIG. 1) of the grip 3 adjacent to the arm 3b.

Figure 4:
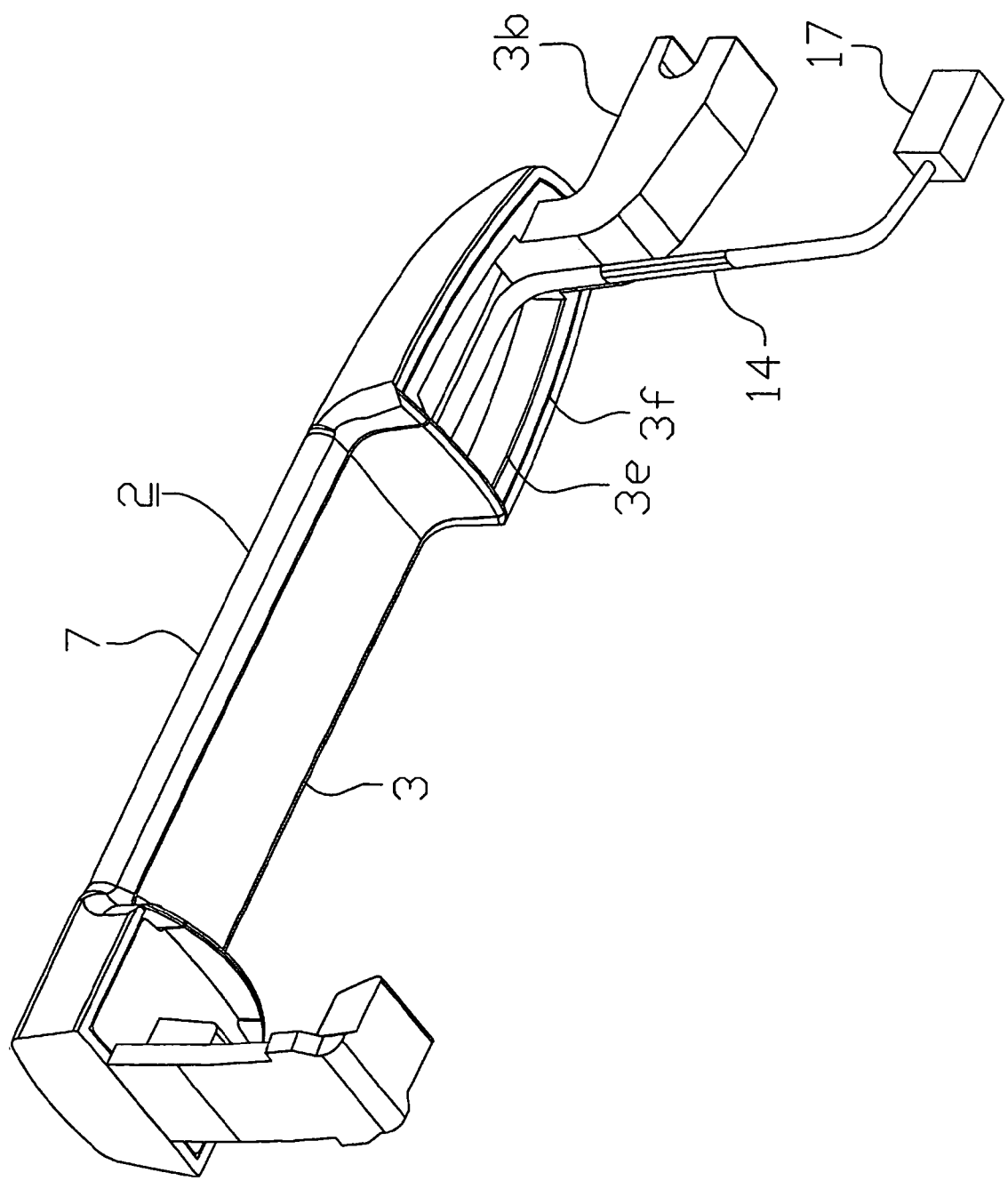
FIG. 4 is a perspective view showing a state before the handle seat is assembled to a door handle as viewed from the bottom of the door handle device.

As shown in FIG. 4, a flange surface 3f on which a base plate 10a of a handle seat 10 to be described later abuts is provided around the seat mounting hole 3e.

As shown in FIG. 1, the handle base 4 having the arm 3b and protruding portion 3d of the grip 3 mounted therein is formed of a resin material such that it may have a concave part 4a which coincides with a concave shape 6a of the door panel 6.

The handle base 4 is attached to the vehicle inside (bottom side in FIG. 1) of the door panel 6.

A handle insertion hole 4b for allowing the arm 3b of the grip 3 to be inserted therethrough and a handle mounting part 4c are formed in the handle base 4.

Moreover, a journaling projection 4d which fits into the shaft hole 3c of the arm 3b of the grip 3 to pivotably journal the grip 3 is formed in the handle mounting part 4c.

A screw stopping member 11 which can be threadedly engaged with a screw 12 is provided in the handle insertion hole 4b of the handle base 4.

The handle base 4 is fixed to the door panel 6 by inserting the door panel 6 into a gap between a base 11a of the screw stopping member 11 and the handle base 4 to tighten the screw 12 securely.

Meanwhile, a handle lever 13 for operating a door lock apparatus (not shown) on the vehicle rear side (left side in FIG. 1) of the handle base 4 is engaged with the protruding portion 3d of the grip 3.

Accordingly, if the grip 3 is operated to rotate so as to be pulled out toward the outside of the vehicle, the handle lever 13 also moves with movement of the protruding portion 3d of the grip 3, and thereby the door lock apparatus is operated to release locking of a door.

Figure 2:
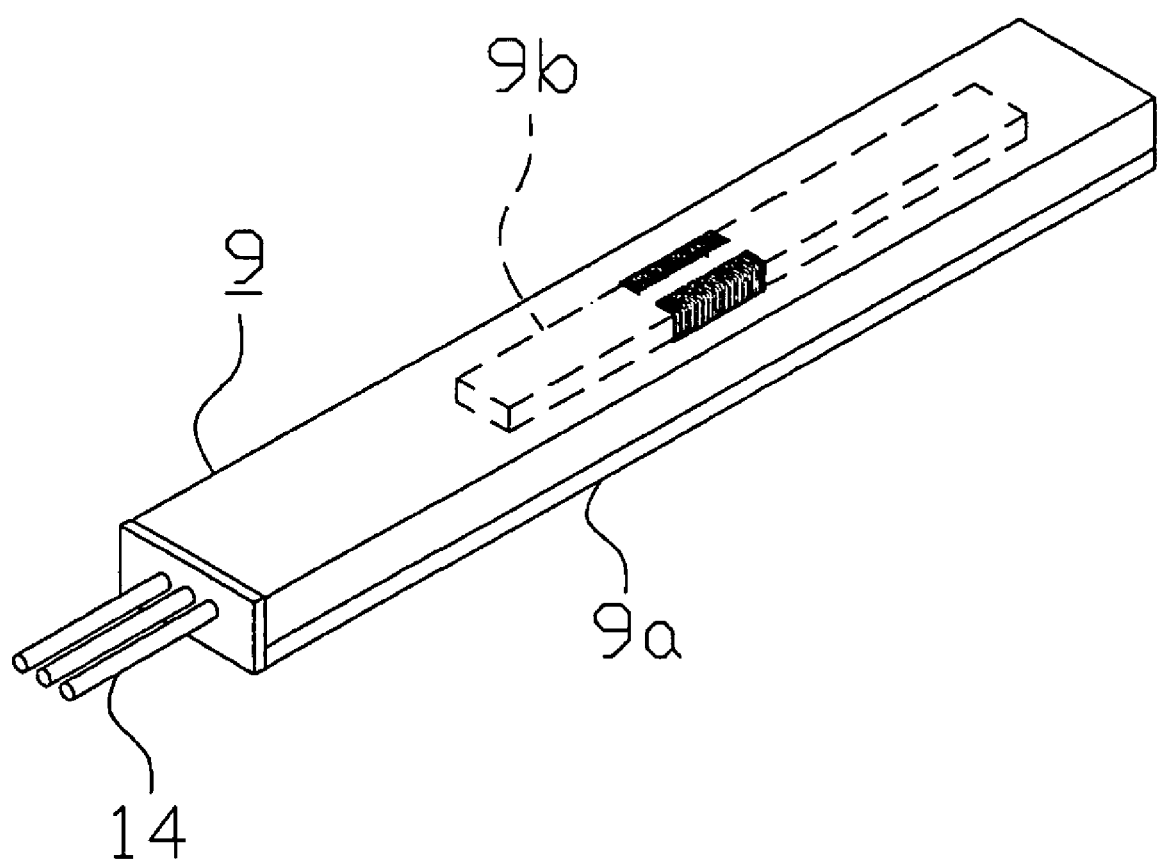
FIG. 2 is a perspective view of an electric component included in the door handle device.

As shown in FIG. 2, the electric component 9 composed of a contact sensor electrode 9a, a transmission antenna 9b, etc. is disposed in the hollow part 8 within the grip 3.

The electric component 9 configured as such controls a door lock apparatus along with a control device on the side of the vehicle (not shown).

For example, when the sensor electrode 9a disposed in the grip 3 detects that a person's hand has approached the grip 3, a starting signal is transmitted to the outside of the vehicle from the transmission antenna 9b.

A radio signal transmitted from an electronic key carried by an operator in response to the starting signal is received by a receiving antenna provided on the side of a vehicle body (not shown). Then, on condition that the received radio signal coincides with a registered radio signal, the door lock apparatus is controlled so that it may operate to shift to a locked state when it is in an unlocked state, or shift to an unlocked state when it is in a locked state.

A harness 14 for transmitting and receiving signals or supplying electric power is connected to the electric component 9. The harness 14 passes through the insertion hole 4b of the handle base 4 to be wired in a vehicle door via an arm insertion hole 10b formed in the handle seat 10 from the seat mounting hole 3e formed in the grip 3.

Figure 5:
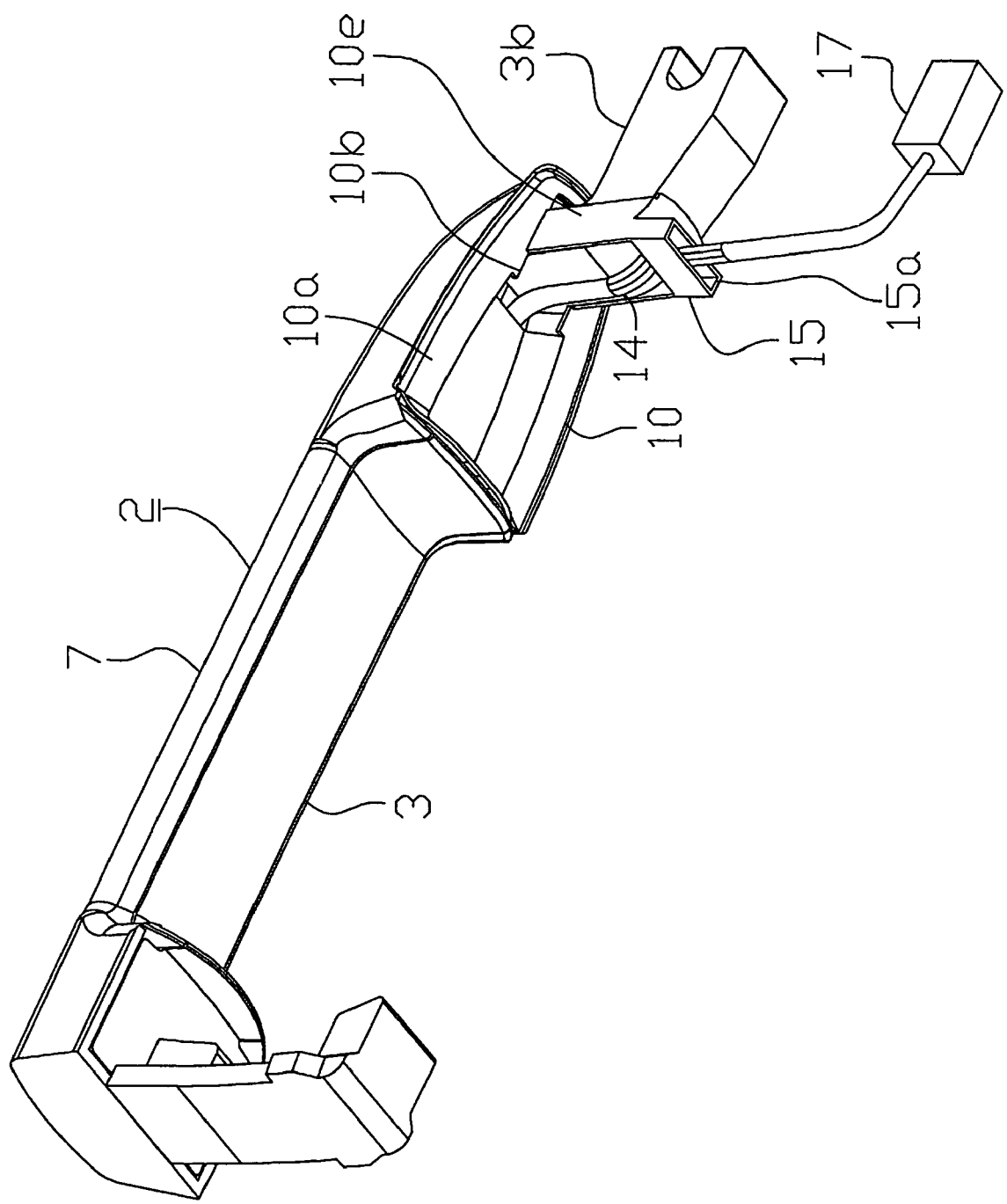
FIG. 5 is a perspective view similar to FIG. 4, showing a state after the handle seat is assembled to the door handle.

As shown in FIG. 1 or 5, the handle seat 10 is mounted in the seat mounting hole 3e of the grip 3.

Figure 3:
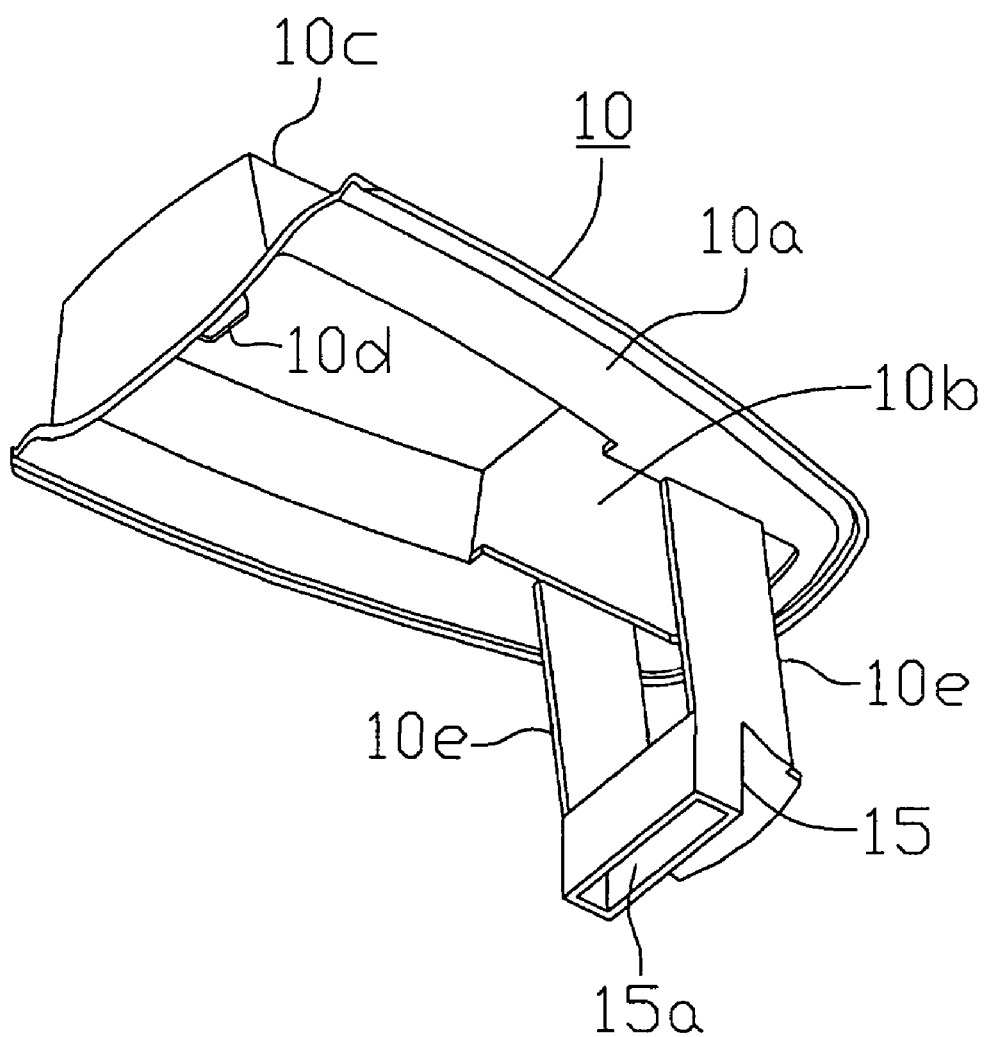
FIG. 3 is a perspective view of a handle seat included in the door handle device.

The handle seat 10 of this embodiment, as shown in FIG. 3, includes the base plate 10a disposed along the door panel 6.

The arm insertion hole 10b which allows the arm 3b of the grip 3 to be inserted thereinto is provided on the side of one end of the base plate 10a which is located on the front side of the vehicle (right side in FIG. 3).

Further, an upwardly protruding fixed part 10c is provided from the other end of the base plate 10a on the rear side (left side in FIG. 3) of the vehicle to the arm insertion hole 10b.

A screw hole 10d corresponding to a screw stopper 7a of the cover 7 is formed in the fixed part 10c.

Moreover, a pair of frame plate parts 10e are provided in the base plate 10a from the edge of the arm insertion hole 10b.

These frame plate parts 10e are provided so as to protrude from the vehicle inside (bottom side in FIG. 1) of the door panel 6, and a holding part 15 which holds the harness 14 of the electric component 9 to be described later is built over both the frame plate parts on the side of protruding ends of the frame plate parts 10e.

Note that the holding part 15 may be provided in either of the two frame plate parts 10e, and may be provided in the central part of the frame plate part 10e which does not protrude from the arm 3b.

Further, the holding part 15 is formed as a harness fastening hole 15a which is formed substantially in the shape of a cylinder to allow the harness 14 to be inserted therethrough.

Next, the procedure for assembling the door handle device 1 for a vehicle will be described.

First, as shown in FIG. 4, the electric component 9 is accommodated into the recessed part 3a of the grip 3, and the harness 14 connected to the electric component 9 is inserted through the seat mounting hole 3e. Also, the cover 7 is fixed to the grip 3 so as to cover the recessed part 3a of the grip 3, and the cover 7 is fixed to the grip 3 with screws (not shown).

In this case, it is preferable that the electric component 9 is fixed to the recessed part 3a with adhesive, etc., or a fixing member like sponge is provided on the back side of the cover 7 and then the cover is attached to the grip so that the fixing member may fix the electric component 9 in pressure contact with the recessed part 3a.

Then, as shown in FIG. 5, the arm 3b of the grip 3 is inserted into the arm insertion hole 10b of the handle seat 10, and the harness 14 of the electric component 9 is passed through and pulled out of the arm insertion hole, and further inserted through the harness fastening hole 15a formed in the holding part 15.

This allows a midway portion of the harness 14 to be held by the holding part 15 formed in the handle seat 10, so that the harness 14 is wired so as to float along the arm 3b.

Further, the fixed part 10c of the handle seat 10 is fitted into the seat mounting hole 3e, and the handle seat 10 and the cover 7 are fixed with screws 16.

At this time, the base plate 10a of the handle seat 10 abuts on the flange portion 3f (refer to FIG. 4) of the grip 3, and thereby the handle seat 10 is fixed to the grip 3.

In this way, the door handle 2 including the electric component 9 is assembled integrally.

In this embodiment, a connector 17 for connecting the electric component 9 to an onboard control device (not shown) inserts the harness 14 through the harness fastening hole 15a, and is then attached to the end of the harness 14.

Next, the handle base 4 is disposed in a predetermined position from the vehicle inside of the door panel 6 on an assembly line for vehicles.

Then, the handle base 4 is fixed to the door panel 6 by inserting the base 11a of the screw stopping member 11 of the handle base 4 into a hole formed in the door panel 6 to tighten the screw 12 securely.

As described above, as for the handle base 4 assembled to the door panel 6, the door handle 2 is assembled to the handle base 4 from the vehicle outside of the door panel 6.

In detail, the arm 3b of the door handle 2 is inserted into the handle insertion hole 4b of the handle base 4 via the hole formed in the door panel 6, and the shaft hole 3c of the arm 3b is fitted into the journaling projection 4d of the handle base 4.

Then, the protruding portion 3d of the door handle 2 is inserted into the mounting hole 4e of the handle base 4 via the hole of the door panel 6, and the door handle 2 is assembled to the handle base 4 by making the handle lever 13 engage the protruding portion 3d.

Finally, the external attaching member 5 is mounted into the mounting hole 4e of the handle base 4 from the vehicle outside of the door panel 6, and the rear end of the handle base 4 is fixed to the door panel 6 by tightening the screw 18 to the screw stopper 5a.

This completes the assembling of the door handle device 1.

Figure 6:
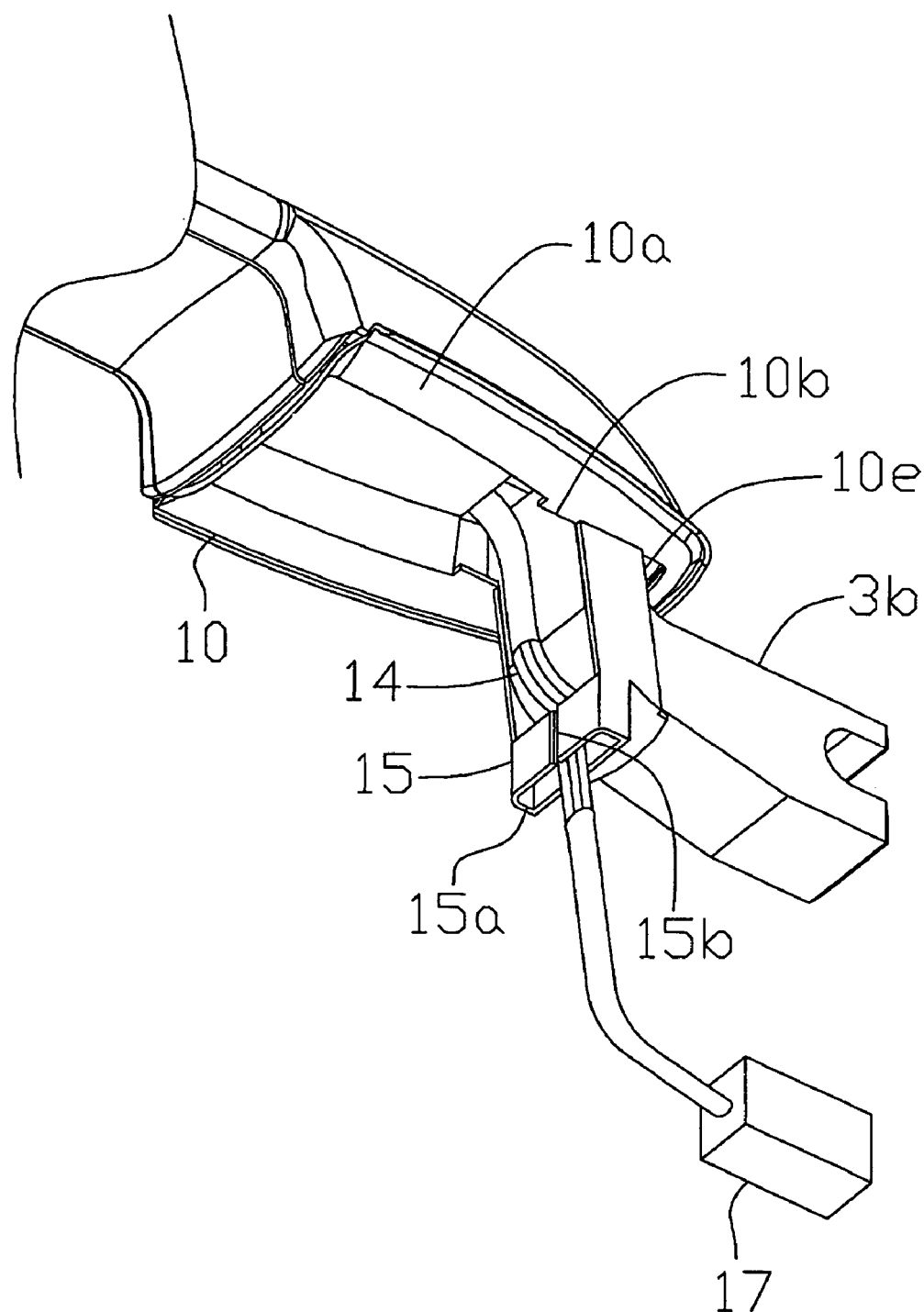
FIG. 6 is a partially enlarged perspective view of the door handle device showing an embodiment in which cutouts are provided in a harness holding part.

The above embodiment is configured such that the harness fastening hole 15a is formed in the holding part 15 provided in the handle seat 10, and the harness is inserted from one side of the harness fastening hole 15a. However, cutouts 15b may be provided in a side face of the holding part 15, as shown in FIG. 6.

This configuration allows the harness 14 to be pushed into and inserted through the holding part 15 even in a state where the connector 17 is connected to an end of the harness 14.

Figure 7:
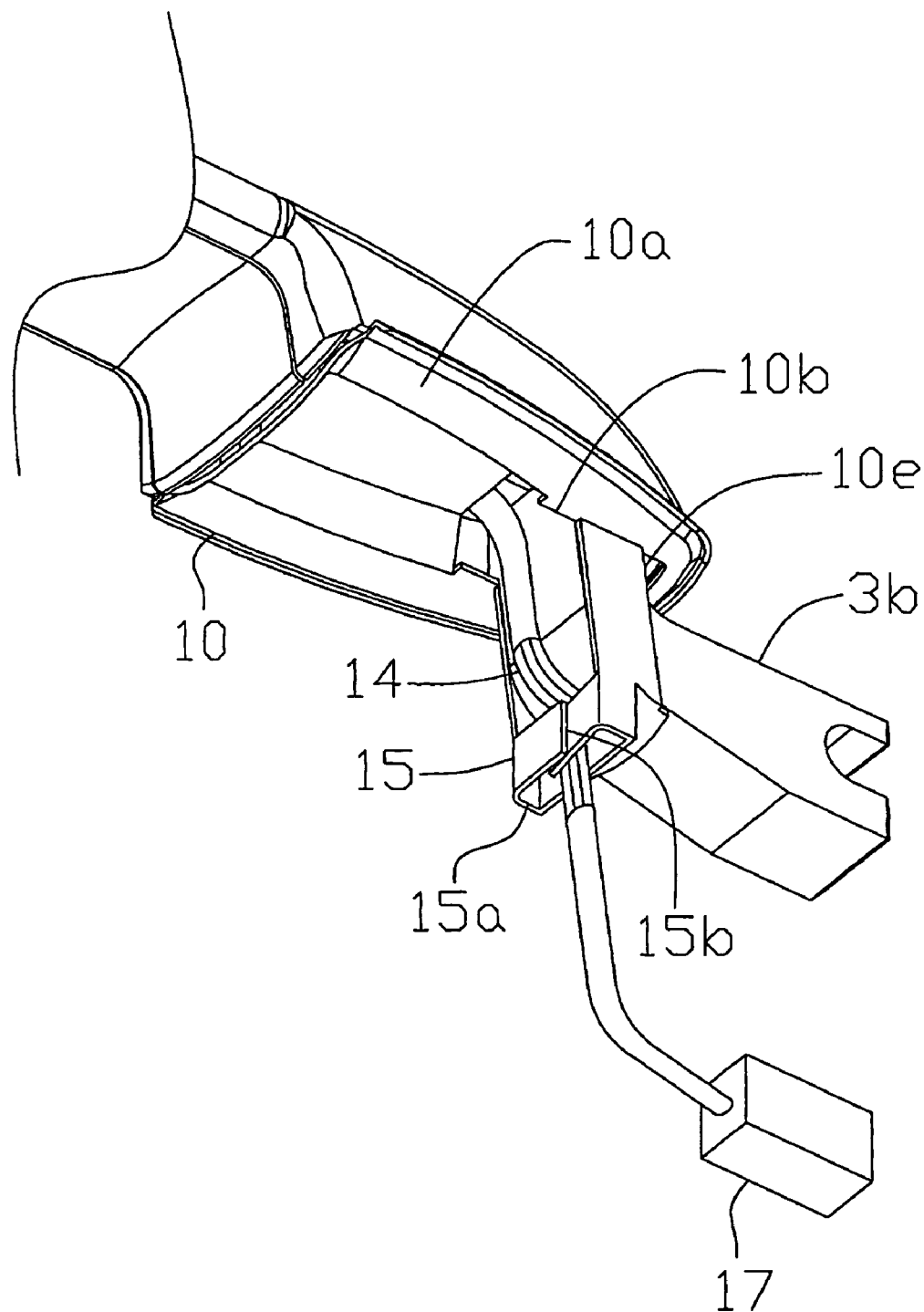
FIG. 7 is a partially enlarged perspective view of the door handle device showing another embodiment in which a harness holding part is formed in an overlapping manner.

Further, the cutouts 15b of the holding part 15, as shown in FIG. 7, may be formed so as to partially overlap each other so that the harness 14 may not be separated from the holding part 15.

This configuration can prevent the harness 14 from being separated from the cutouts 15b.

Figure 8:
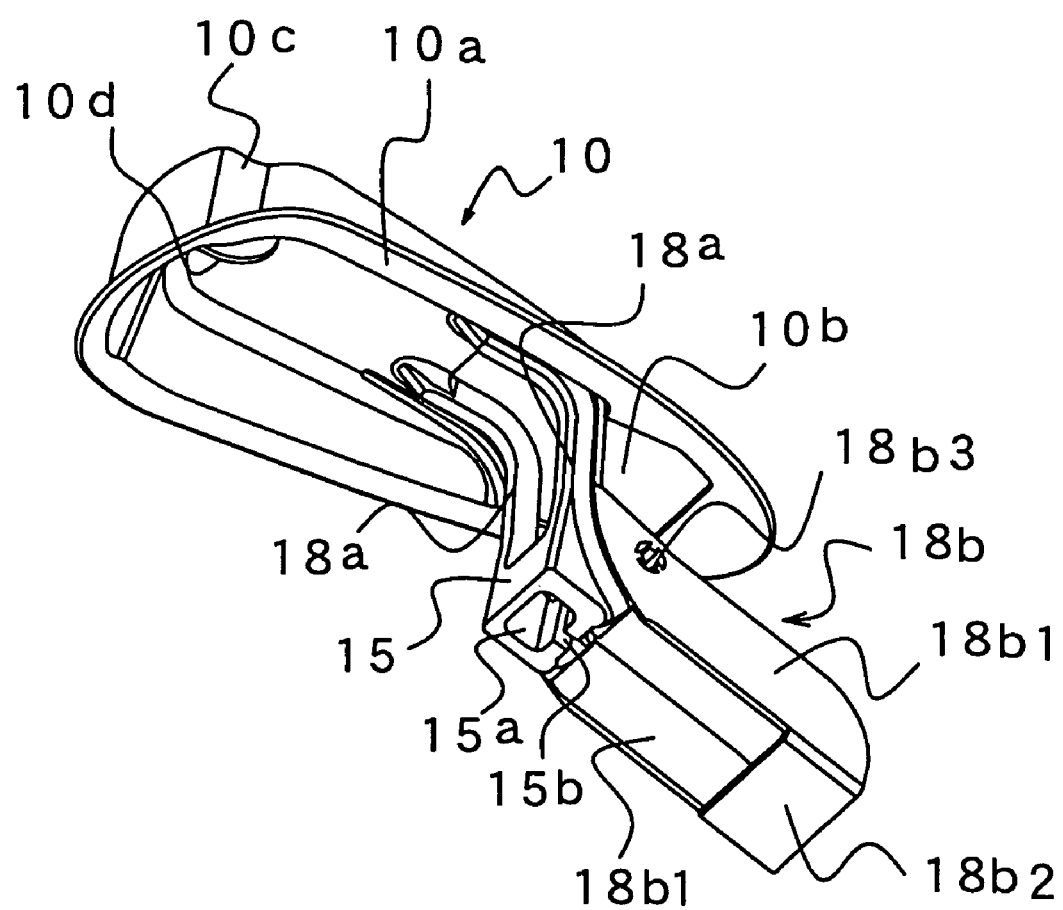
FIG. 8 is a perspective view showing another embodiment of the handle seat included in the above door handle device.

The cutouts 15b of the holding part 15, as shown in FIG. 8, can also be formed so that they may become the arm 3b.

In the handle seat 10 shown in FIG. 8, the pair of frame plate parts 10e is composed of an upright frame plate portion 18a and a frame plate portion 18b which is bent toward the front of the vehicle, and the holding part 15 is provided on the side of a tip of the frame plate portion 18a.

The frame plate portion 18b is compose of side plates 18b1 which are made to face each other and a flat plate 18b2 connecting the side plates. A small hole 18b3 which allows the convex portion 3g provided in the arm 3b to protrude thereinto is further provided in the side plates 18b1.

Figure 9:
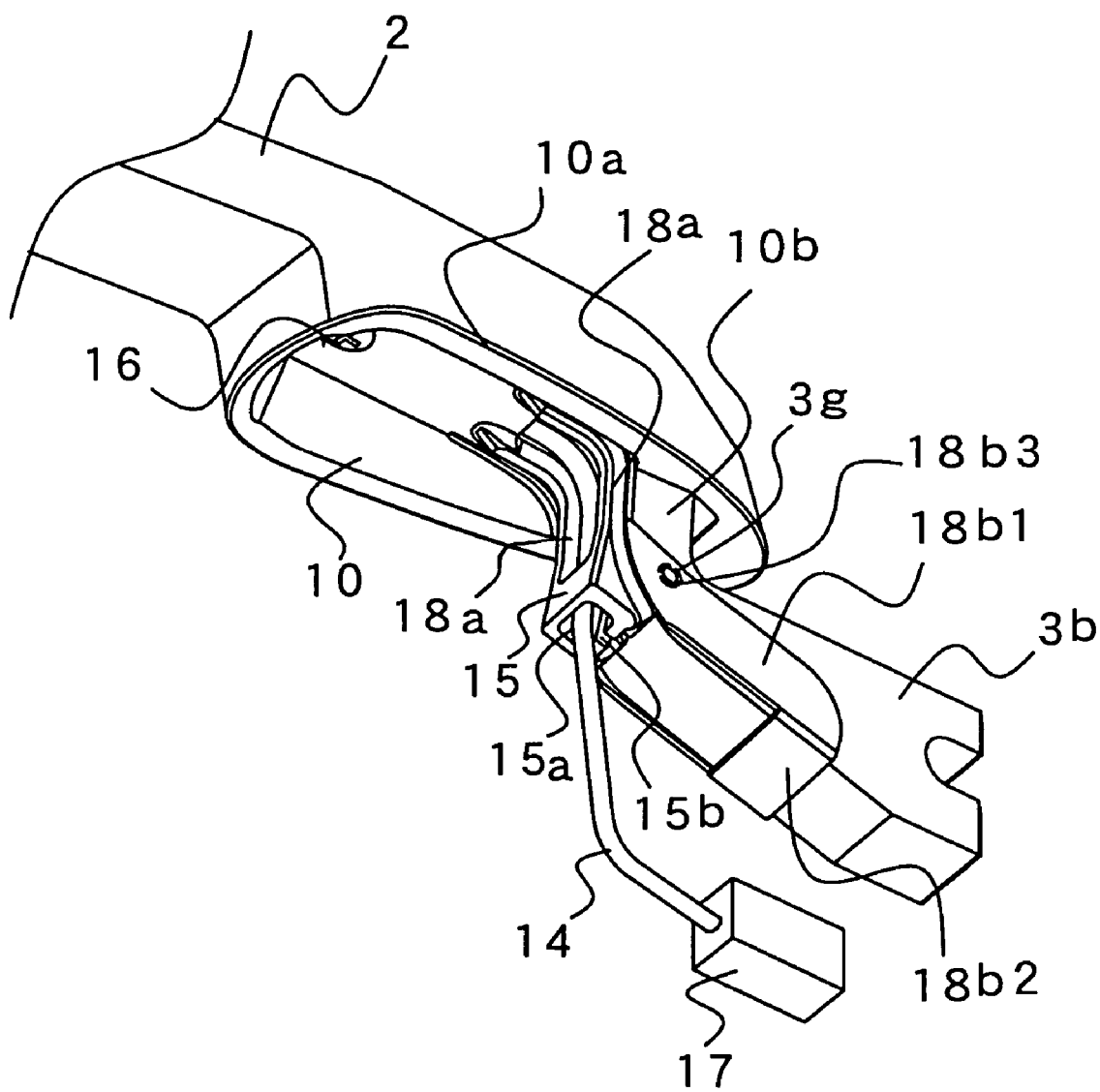
FIG. 9 is a partially enlarged perspective view of the door handle device showing a state after the handle seat shown in FIG. 8 is assembled to a door handle.

FIG. 9 shows a state where the handle seat 10 is assembled to the handle 2.

As shown in this figure, the handle seat is assembled to the handle such that the arm 3b is made to project from the arm insertion hole 10b, the side plates 18b1 and the flat plate 18b2 are made to contact the side faces of the arm and the underside of the arm, respectively, and the convex portion 3g of the arm 3b is made to protrude into the small hole 18b3.

In the handle seat 10, forming the cutouts 15b on the side of the arm surely prevents the harness 14 from being separated from the holding part 15. Thus, in particular, since cutouts are provided on the side of the arm, the wall portion of the holding part 15 prevents the harness 14 from being separated from the handle on the rear side, and the arm 3b prevents the harness 14 from being separated from the handle on the front side. In this manner, separation of the harness 14 is absolutely prevented.

Further, the provision of the side plates 18b1, the flat plate 18b2, the small hole 18b3, etc. regulates that the front end of the handle seat 10 is separated from the grip 3 by the tension applied to routing of the harness 14.

On the other hand, in the above-mentioned holding part 15, the harness fastening hole 15a is provided on the side of the protruding tips of the frame plate parts 10e provided to protrude toward the vehicle inside (lower side in FIG. 1) of the door panel 6 to hold the harness 14 of the electric component 9.

Accordingly, the harness 14 can be fixed in a place near the tip of the harness 14 to which the connector 17 is to be connected in such a manner that the holding part 15 is made to project further toward the vehicle inside than the tip of the arm 3b.

This can reduce the distance of a portion of the harness 14 between the connector 17 and the holding part 15. For this reason, even in a case where the harness 14 vibrates owing to vibration during traveling of a vehicle, vibration of an engine, etc., oscillation of the harness 14 caused by the vibrations can be prevented.

That is, since the amplitude of the oscillating harness 14 can be suppressed, it is possible to prevent generation of an abnormal noise due to contact of the harness with the door panel 6.

Note that, as for the handle seat 10 of FIG. 8, the tip of the frame plate portion 18a is provided inside the vehicle, so that oscillation of the harness 14 can be prevented similarly to the above.

Further, most of the seat mounting hole 3e is covered by the fixed part 10c of the handle seat 10 even in a case where the seat mounting hole 3e is largely formed such that the connector 17 can be inserted through the seat mounting hole. As a consequence, the harness 14 is led to the seat mounting hole 3e while being guided by the surface of the fixed part 10c by sizing the seat mounting hole 3e such that the arm 3b and the harness 14 can be inserted through the seat mounting hole.

Accordingly, the harness 14 can be wired along the arm 3b without relaxing the portion of the harness 14 between the handle seat 10 and the holding part 15 by inserting the harness 14 through the harness fastening hole 15a.

The above-described configuration allows the electronic component 9 to be incorporated into the door handle 2 after an operational test of the electric component 9 is carried out in a state where the connector 17 is connected to the harness 14 of the electric component 9. For this reason, malfunctions caused by poor connection, etc. can be reduced.

In the door handle device 1 for a vehicle configured as described above, when an operator brings his/her hand close to the door handle 2, the contact sensor electrode 9a of the electric component 9 built in the door handle 2 detects a proximity state of the hand depending on a change in electrostatic density, etc., and transmits a starting signal from the transmission antenna 9b on the basis of the amount of change.

Also, in a case where a radio signal from an electronic key carried by an operator coincides with a radio signal stored in an onboard control device, a door lock apparatus operates so that it may be changed to a locked state or an unlocked state.

What is claimed is:

1. A vehicle door handle device, including a door handle which is composed of a handle base fixed inside a door panel, a grip at one end of which an arm having a shaft hole which is pivotably engaged with the handle base is provided and in which a recessed part accommodating an electric component is formed, and a cover which covers the recessed part of the grip, the door handle device comprising:
a seat mounting hole which is opened so that a harness connected to the electric component can be drawn out to the outside and which is formed in the grip, and
a handle seat having a base plate which is fixed to the grip, the base plate being disposed between the grip and the door panel, and being formed as a separate piece from the grip, wherein
the handle seat is provided with an arm insertion hole which is formed in the base plate to allow the arm of the grip to be inserted therethrough, a pair of frame plate parts protruding parallel to each other from an edge of the arm insertion hole, and a holding part which is provided integrally with the frame parts and formed nearly cylindrically in order to have a harness fastening hole so as to allow the harness to be inserted therethrough toward a direction to an inside portion of the door panel and wherein
a side face of the holding part is provided with cutouts which are formed to allow the harness to be introduced into the harness fastening hole in a state of connecting a connector at one of a terminal portion of the harness,
wherein the harness is held by the handle seat so as to be along with an outside surface of the arm of the grip by allowing the harness which is drawn out from the arm insertion hole to be inserted through the harness fastening hole.

2. The door handle device for a vehicle according to claim 1, wherein the base plate of the handle seat is provided with a fixed part which covers a portion of the seat mounting hole of the grip, and the arm insertion hole of the handle seat is formed so as to communicate with the portion of the seat mounting hole with the handle seat being fixed to the handle base, and is constructed for the harness to be along with an outside surface of the arm of the grip by the harness being led to the harness fastening hole from the arm insertion hole.

3. The door handle device for a vehicle according to claim 2, wherein the holding part provided in the handle seat is provided at tip ends of the frame plate parts such that it may be located nearer to the inner side of the door panel than a tip end of the arm.

4. The door handle device for a vehicle according to claim 2, wherein a side face of the holding part provided in the handle seat is provided with cutouts which can introduce the harness into the harness fastening hole.

5. The door handle device for a vehicle according to claim 1, wherein the holding pan provided in the handle seat is provided at tip ends of the frame plate parts such that it may be located nearer to the inner side of the door panel than a tip end of the arm.

6. The door handle device for a vehicle according to claim 4, wherein the holding part provided in the handle seat is provided at tip ends of the frame plate parts such that it may be located nearer to the inner side of the door panel than a tip end of the arm.

* * * * *